United States Patent
Ling et al.

(10) Patent No.: US 9,191,183 B2
(45) Date of Patent: Nov. 17, 2015

(54) USING DECISION FEEDBACK PHASE ERROR CORRECTION

(71) Applicant: MaxLinear, Inc., Carlsbad, CA (US)

(72) Inventors: Curtis Ling, Carlsbad, CA (US); Timothy Gallagher, Encinitas, CA (US)

( * ) Notice: Subject to any disclaimer, the term of this patent is extended or adjusted under 35 U.S.C. 154(b) by 0 days.

(21) Appl. No.: 14/470,720

(22) Filed: Aug. 27, 2014

(65) Prior Publication Data

US 2015/0110232 A1    Apr. 23, 2015

Related U.S. Application Data

(60) Provisional application No. 61/870,502, filed on Aug. 27, 2013.

(51) Int. Cl.
| | | |
|---|---|---|
| *H04L 25/40* | (2006.01) | |
| *H04L 7/00* | (2006.01) | |
| *H04L 7/033* | (2006.01) | |
| *H04B 7/06* | (2006.01) | |

(52) U.S. Cl.
CPC .............. *H04L 7/0016* (2013.01); *H04B 7/061* (2013.01); *H04L 7/033* (2013.01)

(58) Field of Classification Search
CPC ................................ H04B 7/061; H04L 7/033
USPC ......................................................... 375/371
See application file for complete search history.

(56) References Cited

U.S. PATENT DOCUMENTS

| | | | |
|---|---|---|---|
| 2005/0265436 A1* | 12/2005 | Suh et al. | 375/221 |
| 2006/0039318 A1* | 2/2006 | Oh et al. | 370/328 |
| 2008/0123615 A1* | 5/2008 | Hoshino et al. | 370/343 |
| 2009/0129493 A1* | 5/2009 | Zhang et al. | 375/260 |
| 2010/0142658 A1* | 6/2010 | Liu et al. | 375/343 |
| 2011/0128924 A1* | 6/2011 | Coon et al. | 370/329 |
| 2011/0200080 A1* | 8/2011 | Fang et al. | 375/222 |
| 2012/0321318 A1* | 12/2012 | Xu et al. | 398/76 |
| 2013/0287069 A1* | 10/2013 | SU et al. | 375/219 |
| 2014/0092924 A1* | 4/2014 | Krause et al. | 370/536 |

* cited by examiner

*Primary Examiner* — Santiago Garcia
(74) *Attorney, Agent, or Firm* — McAndrews, Held & Malloy, Ltd.

(57) ABSTRACT

Methods and systems are provided for using decision feedback phase error correction during signal processing. When an input signal comprises a plurality of sub-carriers, each of the plurality of sub-carriers may be processed separately, wherein the processing may comprise determining for each one of the plurality sub-carriers error related information; and the determined error related information may be applied as separate feedback, such as to allow separately adjusting subsequent processing of the corresponding one of the plurality of sub-carriers. The error related information may comprise phase error related information. At least part of the error related information based on data carried by the corresponding one of the plurality of sub-carriers. The plurality of sub-carriers comprises orthogonal frequency-division multiplexing (OFDM) based sub-carriers. Error related information obtained from processing of at least some of the plurality of sub-carriers may be shared.

25 Claims, 7 Drawing Sheets

USING DECISION FEEDBACK PHASE ERROR CORRECTION

CLAIM OF PRIORITY

This patent application makes reference to, claims priority to and claims benefit from the U.S. Provisional Patent Application No. 61/870,502, filed on Aug. 27, 2013, which is hereby incorporated herein by reference in its entirety.

TECHNICAL FIELD

Aspects of the present disclosure relate to communications. More specifically, certain implementations of the present disclosure relate to methods and systems for using decision feedback phase error correction.

BACKGROUND

Existing methods and systems for handling phase related issues (e.g., errors) during communications of signals can be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for using decision feedback phase error correction, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Certain example implementations may be found in method (s) and system(s) for non-intrusive noise cancellation in electronic devices, particularly in user-supported devices. As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
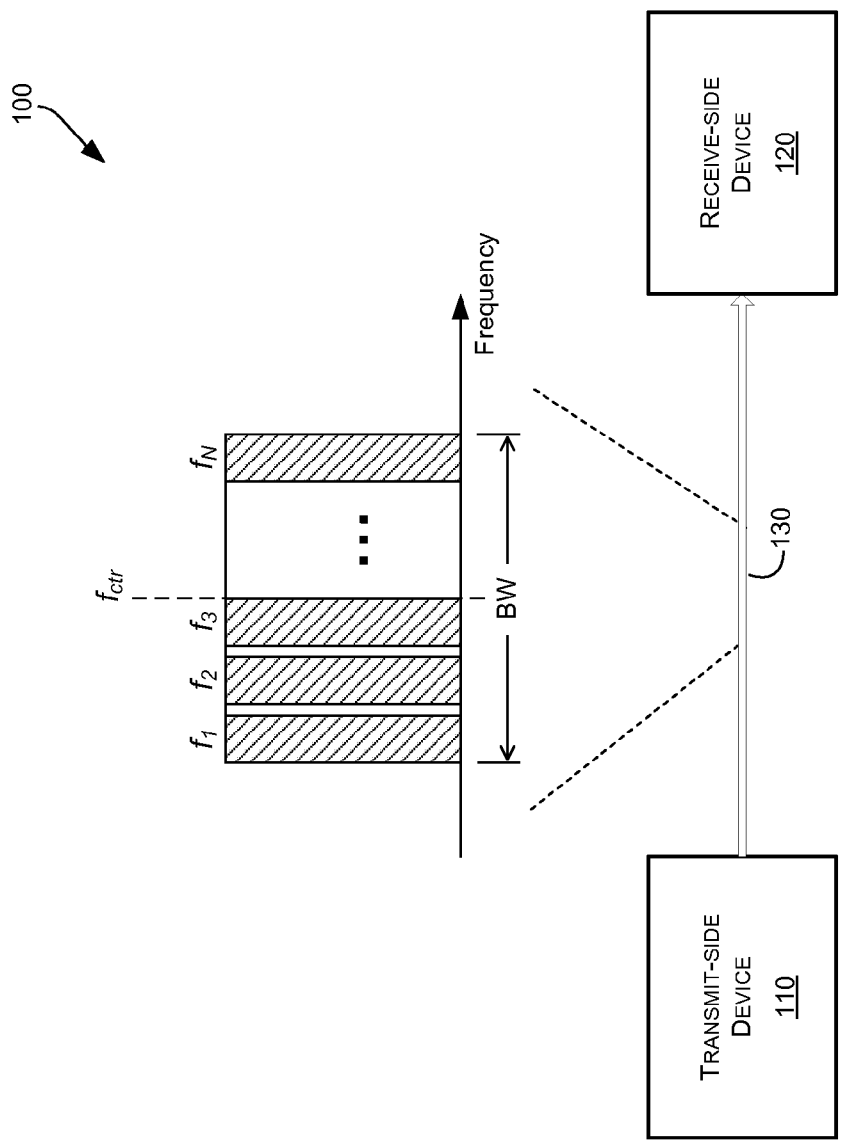
FIG. 1 illustrates an example communication system, which may be configured to communicate signals carrying multiple sub-carriers.

FIG. 1 illustrates an example communication system, which may be configured to communicate signals carrying multiple sub-carriers. Referring to FIG. 1, there is shown a communication system 100.

The communication system 100 may comprise a plurality of electronic devices, of which devices 110 and 120 are shown. The communication system 100 may correspond to, for example, a distribution network, such as a cable television network or the like, in which one or more head-end nodes may broadcast signals carrying content (e.g., corresponding to TV channels) to a plurality of subscriber devices. Nonetheless, the communication system 100 is not limited to any particular type of network, and may comprise any arrangement in which a plurality of elements (e.g., nodes) may communicate with one another. In the particular use scenario described with respect to FIG. 1, the device 110 may be a transmit-side device whereas the device 120 may be a receive-side device. Nonetheless, it should be understood that the devices are not necessarily limited in that functions, and such their role (and as such functions performed thereby) may be reversed in other use scenarios—that is the device 120 would be the transmit-side device whereas the device 110 would be the receive-side device.

Each of the devices 110 and 120 may comprise suitable circuitry for implementing various aspects of the disclosure. For example, each of the transmit-side device 110 and the receive-side device 120 may be configured to support communication of signals therebetween, such as over wired and/or wireless connections. Each of the transmit-side device 110 and the receive-side device 120 may support, for example, a plurality of wired and/or wireless interfaces and/or protocols, and may be operable to perform necessary processing operations to facilitate transmission and/or reception of signals. Examples of signal processing operations that may be performed by electronic devices (e.g., the transmit-side device 110 and/or the receive-side device 120) may comprise, for example, filtering, amplification, analog-to-digital conversion and/or digital-to-analog conversion, up-conversion/down-conversion of baseband signals, encoding/decoding, encryption/decryption, modulation/demodulation, or the like.

Examples of wireless protocols or standards that may be supported and/or used by electronic devices (e.g., the transmit-side device 110 and/or the receive-side device 120) may comprise wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+(e.g., GSM/CPRS/EDGE, and IS-95 or cdmaOne) and/or 2G/2G+ (e.g., CDMA2000, UMTS, and HSPA); 4G standards, such as WiMAX (IEEE 802.16) and LTE; Ultra-Wideband (UWB), and/or the like. Examples of wired protocols and/or interfaces that may be supported and/or used by the electronic devices (e.g., the transmit-side device 110 and/or the receive-side device 120) may comprise Ethernet (IEEE 802.2), Fiber Distributed Data Interface (FDDI), Integrated Services Digital Network (ISDN), cable television (ATSC, DVB-C) and cable internet (DOCSIS), and/or Universal Serial Bus (USB) based interfaces.

Examples of electronic devices (e.g., the transmit-side device 110 and/or the receive-side device 120) may comprise cellular and smart phones or similar handheld devices, tablets, personal computers, laptops or notebook computers, servers, personal media players, personal digital assistants, set-top boxes (STBs), wireless access points, base stations, systems used at provider head-ends to broadcast to (or otherwise communicate with) one or more client devices, or other like devices. The disclosure is not limited, however, to any particular type of electronic device, and may apply to any electronic device that may be configured for communication, particularly in the manner described in accordance with the present disclosure.

For example, in the particular use scenario depicted in FIG. 1, the transmit-side device 110 may correspond to, for example, a head-end node (e.g., a head-end node in cable television network) whereas the receive-side device 120 may correspond to a subscriber system (e.g., a cable television set-top box or receiver). Accordingly, the transmit-side device 110 may be configured to communicate via a link 130 (e.g., a wired-line cable television connection) to the receive-side device 120 signals carrying content (e.g., corresponding to cable television content). The link 130 may be unidirectional (e.g., allowing only for broadcasts from the transmit-side device 110 to the receive-side device 120). In some instances, however, the link 130 may be bidirectional—e.g., to allow for communication from the receive-side device 120, such as control data (feedback or status), content request, or the like.

In some instances, signals communicated in the system 100 may carry multiple, distinct contents. For example, in instances where signals communicated over link 130 correspond to cable television (or similar types of broadcasts), the signals may carry content corresponding to multiple channels. In this regard, embedding information corresponding to different streams (e.g., different channels) into communicated signals may be achieved by use of multiple sub-carriers. These sub-carriers may be incorporated into the communicated signals using various techniques. For example, multiple sub-carriers may be incorporated into a single carrier signal using orthogonal frequency-division multiplexing (OFDM). The multiple sub-carriers may be allocated and/or assigned for carrying the different content (e.g., corresponding to multiple channels). For example, communication of signals from the transmit-side device 110 to the receive-side device 120, over link 130, may be configured for multi-channel transmission signals, with each carrier signal containing, as an example, a plurality (N, which is a non-zero integer) individual sub-signals (sub-carriers) for carrying a corresponding plurality of different content (e.g., channels). The channels may correspond to, for example, separate television programs in a cable television system. For example, the multiple (N) channels may occupy frequency ranges $f_1$ through $f_N$ within a total multichannel signal spectrum having a bandwidth BW, centered at a center frequency $f_{ctr}$, which may be allocated as a carrier signal.

At the receiver side, the receive-side device 120 may then be configured to receive signals communicated over the link 130, and process the received signals, wherein the processing may comprise extracting from the received signals desired content. For example, the receive-side device 120 may be configured to process received signals (over the total bandwidth BW), but only extract content corresponding to channels of interest within the total bandwidth BW (which may also include other channels that may not be of interest at a particular time, such as other programs on alternate channels in a cable television broadcast, for example).

In the example use scenario shown in FIG. 1, the channels of interest are shown with hashed patterns. In some implementations, extracting sub-carriers (e.g., corresponding to channels of interest) may entail demodulation by a plurality of separate demodulator subsystems which are substantially identical to each other but use narrowband processing to demodulate the multiple signals separately. In this regard, in some instances the channels of interest may be demodulated by, for example, a plurality of separate demodulator subsystems which are identical or substantially identical to each other but use narrowband processing to demodulate the multiple signals separately.

Various issues may exist, however, with communications in which multiple sub-carriers are used. For example, phase errors (e.g., noise) may be introduced during communication of the (carrier) signals. While phase errors may be uniform— e.g., the same in each of the sub-carriers, in some instances the phase errors may vary among the sub-carriers. In legacy systems, however, phase errors are typically determined commonly for all sub-carriers—e.g., a common phase error is determined for all sub-carriers. In this regard, common phase error based estimations may be based on use of pilots (or processing of the carrier signal as a whole) to estimate what the phase error is—e.g., these systems mainly use pilot tones to estimate the common phase error for all sub-carriers. Common phase error estimation is utilized in, for example, digital television (DTV) and/or OFDM based standards.

Accordingly, in various implementations of the present disclosure, phase errors may be estimated separately for each of the sub-carriers, with the phase errors then being utilized (e.g., in closed-loop manner) to enhance the processing of each of the sub-carriers. In other words, the processing of each sub-carrier is particularly configured and/or adjusted based on the phase errors that may particular to the sub-carrier, as described in more detail with respect to the example implementations in the following figures.

Figure 2:
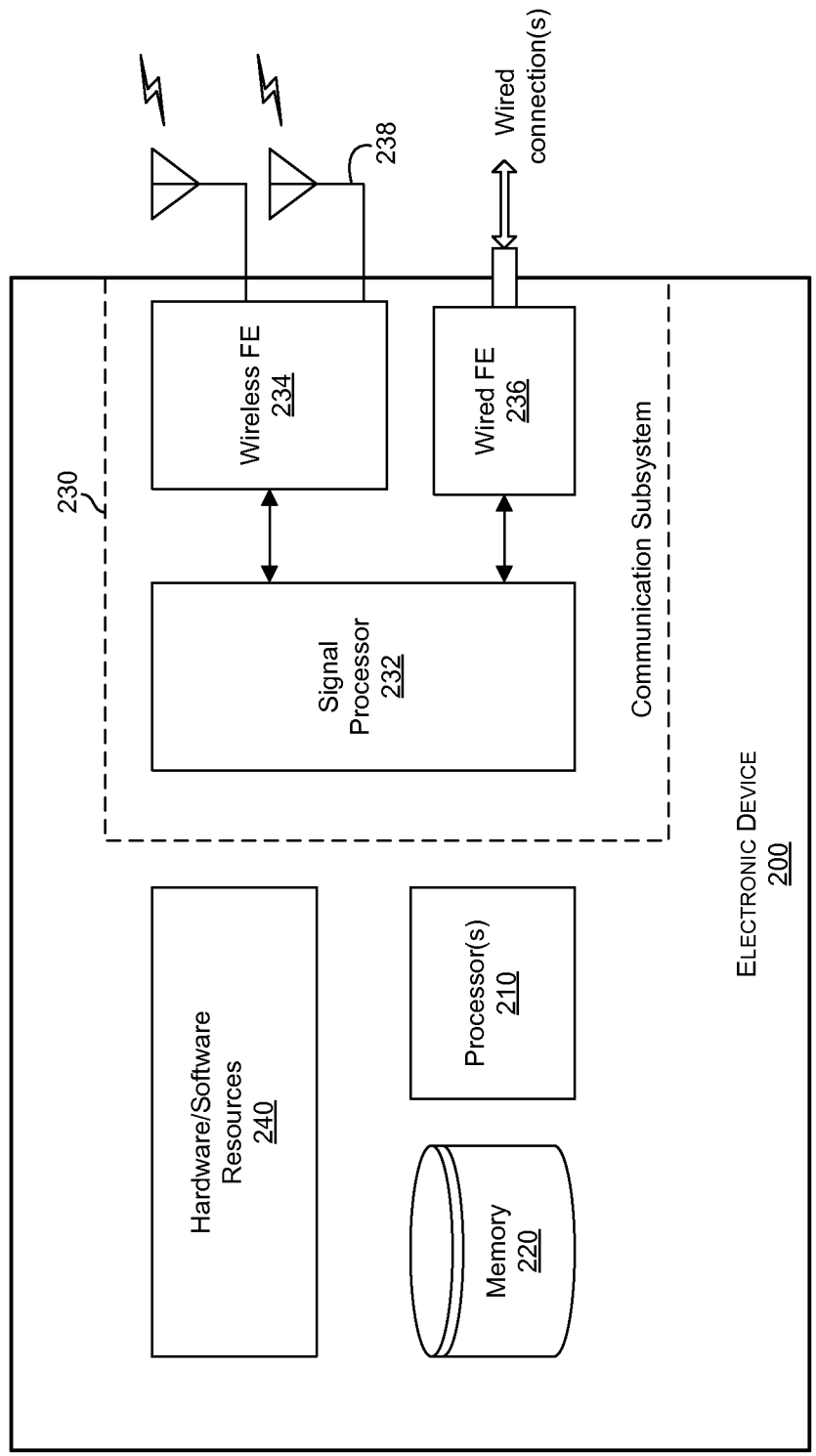
FIG. 2 illustrates an example electronic device, which may support use of decision feedback phase error correction during reception operations.

FIG. 2 illustrates an example electronic device, which may support use of decision feedback phase error correction during reception operations. Referring to FIG. 2, there is shown an electronic device 200.

The electronic device 200 comprises suitable circuitry for implementing various aspects of the present disclosure. For example, the electronic device 200, as used herein, may comprise suitable circuitry for performing or supporting various functions, operations, applications, and/or services. The functions, operations, applications, and/or services performed or supported by the electronic device 200 may be run or controlled based on pre-configured instructions and/or user instructions. For example, the electronic device 200 may be configured and/or implemented as a network element, for use in receiving and/or handling broadcasts (e.g., satellite, cable, terrestrial broadcast, broadband, etc.) or similar types of communications. The electronic device 200 may correspond to, for example, one or both of the electronic device 110 and 120 described in FIG. 1.

In the example implementation depicted in FIG. 2, the electronic device 200 may comprise one or more processors 210, a memory 220, a communication subsystem 230, and hardware/software resources 240.

Each processor 210 may comprise suitable circuitry for processing data, for executing or running particular services, tasks and/or applications, and/or for controlling and/or managing operations (e.g., of other components in the electronic device 200). For example, the processor 210 may configure and/or control operations of various components and/or subsystems of the electronic device 200, by utilizing, for example, one or more control signals. Further, the processor 210 may also enable running and/or execution of applications, programs and/or code, which may be stored, for example, in the memory 220. The processor 210 may comprise a general purpose processor (e.g., central processing unit (CPU)), which may be configured to perform or support particular types of operations (e.g., audio related operations), or a special purpose processor—e.g., a digital signal processor (DSP), a baseband processor, and/or an application processor (e.g., ASIC).

The memory 220 may comprise suitable circuitry for providing permanent and/or non-permanent storage, buffering, and/or fetching of data, which may be used, consumed, and/or processed in the electronic device 200. In this regard, the memory 220 may comprise different memory technologies, including, for example, read-only memory (ROM), random access memory (RAM), Flash memory, solid-state drive (SSD), and/or field-programmable gate array (FPGA). The memory 220 may store, for example, configuration data, which may comprise parameters and/or code, comprising software and/or firmware.

The communication subsystem 230 may comprise suitable circuitry for supporting communication of data to and/or from the electronic device 200. For example, the communication subsystem 230 may comprise a signal processor 232, a wireless front-end 234, a wired front-end 236, and one or more antennas 238. The signal processor 232 may comprise suitable circuitry for processing signals transmitted and/or received by the electronic device 200, in accordance with one or more wired or wireless protocols supported by the electronic device 200. The signal processor 232 may be operable to perform such signal processing operations as filtering, amplification, up-conversion/down-conversion of baseband signals, analog-to-digital conversion and/or digital-to-analog conversion, encoding/decoding, encryption/decryption, and/or modulation/demodulation.

The wireless front-end 234 may comprise circuitry for performing wireless transmission and/or reception (e.g., via the antenna(s) 238), such as over a plurality of supported RF bands. The antenna(s) 238 may comprise suitable circuitry for facilitating over-the-air transmission and/or reception of wireless signals, such as within certain bandwidths and/or in accordance with one or more wireless interfaces supported by the electronic device 200.

The wired front-end 236 may comprise suitable circuitry for performing wired based transmission and/or reception, such as over a plurality of supported physical wired media. The wired front-end 236 may support communications of RF signals via the plurality of wired connectors, within certain bandwidths and/or in accordance with one or more wired protocols (e.g., Ethernet) supported by the electronic device 200.

The hardware/software (HW/SW) resources 240 may comprise various hardware and/or software components of the electronic device 200, which may be utilized for various purposes. The HW/SW resources 240 may comprise dedicated components that are particularly designed and/or implemented to perform particular functions and/or operations, and/or general purpose components that may be configured to perform particular functions and/or operations. For example, the HW/SW resources 240 may comprise user input/output (I/O) resources (e.g., suitable components built-into and/or coupled to the electronic device 200, such as display, mouse, keyboard, keypad, touchscreen, etc., as well any circuitry required to operate these components), audio/video related resources (e.g., suitable components, such as display, microphones, speakers, etc., as well any circuitry required to operate these components), applications (as well any circuitry required to run such applications and/or to store code corresponding thereto), etc.

In operation, the electronic device 200 may be configured as a communication element—e.g., in a network or a communication system, such as the communication system 100 of FIG. 1. For example, the communication subsystem 230 may be utilized in setting up and/or utilizing connections that may be used in communicating signals (e.g., carrying data) to and/or from the electronic device 200 (e.g., within communication system 100). The connections may be established using wired and/or wireless links, which may be setup (and used thereafter) via the wired front-end 236 and/or the wireless front-end 234, respectively. These links may then be used to transmit and/or receive data, which may be used in and/or generated by the electronic device 200 (e.g., via the HW/SW resources 240). For example, TV and other multimedia content (audio and/or video) may be played via suitable HW/SW resources 240 in the electronic device 200.

In some instances, the electronic device 200 may be configured to support communications in which multiple sub-carriers are utilized. In this regard, signals communicated to and/or from the electronic device 200 may carry multiple, distinct contents (e.g., different streams or channels), with the data corresponding to different contents (e.g., different streams or channels) being embedded into communicated signals by use of multiple sub-carriers. These sub-carriers may be incorporated into the communicated signals using various techniques, including orthogonal frequency-division multiplexing (OFDM) for example, as described with respect to FIG. 1 for example.

In various implementations the electronic device 200 may be used to provide adaptive handling of multiple sub-carriers based communications, particularly with respect to handling of various particular issues that may arise with such communications. For example, when utilized as a receive-side device, the electronic device 200 may be configured to receive and process signals incorporating multiple sub-carriers, wherein the processing may comprise extracting from the received signals desired content that is embedded in particular one(s) of the multiple sub-carriers (e.g., only content corresponding to particular channels of interest), as described with respect to FIG. 1 for example. Further, the electronic device 200 may be particularly configured to handle (e.g., identifying and/or correcting) certain issues (e.g., phase errors) which may be introduced during communication of the multiple sub-carriers based signals. For example, rather than determining such phase errors commonly for all sub-carriers, the electronic device 200 may be configured to estimate phase errors separately for each of the sub-carriers, with the phase errors then being utilized (e.g., in closed-loop manner) to enhance the processing of each of the sub-carrier. An example implementation allowing for such adaptive handling is described in more detail with respect to FIGS. 3A and 3B.

Figure 3A:
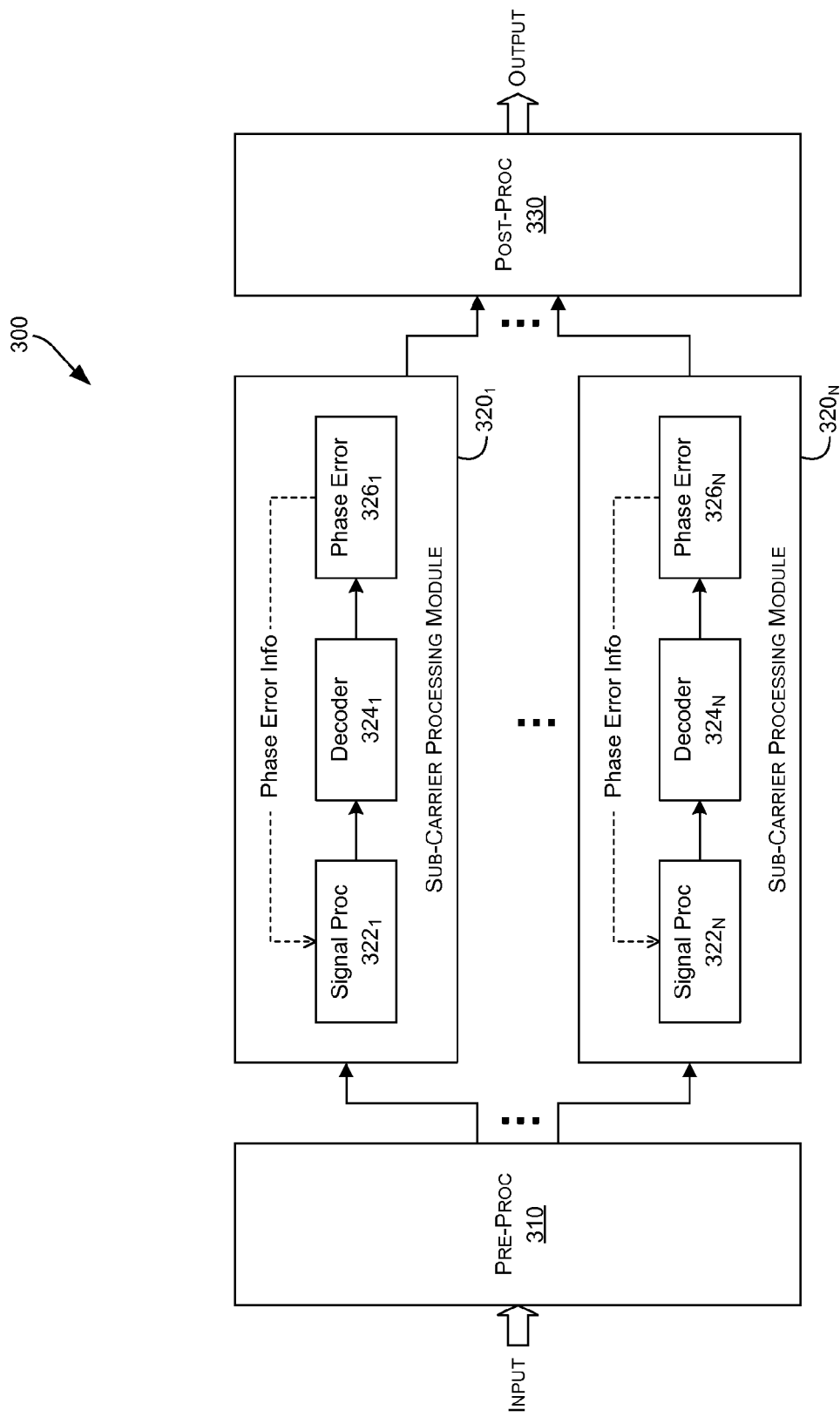
FIG. 3A illustrates an example receiver system, which may be configured to use decision feedback phase error correction.

FIG. 3A illustrates an example receiver system, which may be configured to use decision feedback phase error correction. Referring to FIG. 3A, there is shown a receiver system 300.

The receiver system 300 may comprise suitable circuitry for handling and/or performing signal reception (e.g., of radio frequency, or RF, signals) and/or processing operations related thereto. In this regard, the receiver system 300 may be configured to provide various reception and/or processing related operations and/or functions, comprising, e.g., receiving analog (RF) signals, such as via antennas (or other suitable means for wireless reception) or wired-based connectors, amplification, sampling and analog-to-digital conversions (if needed), and at least some signal processing (e.g., baseband/passband processing and/or digital signal processing). For example, the receiver system 300 may correspond to (at least a portion of) the signal processor 232 of the electronic device 200 in FIG. 2.

The receiver system 300 may be operable to receive and process an analog input, to generate an output (e.g., digital content) corresponding to information carried by (and extracted from) the received input. The receiver system 300 may be configured to support handling of signals comprising one or more sub-carriers. For example, the receiver system 300 may comprise a pre-processing block 310, a plurality of sub-carrier processing modules $320_1$-$320_N$ ('N' being a positive integer), and a post-processing block 330. In this regard, the receiver system 300 may be configured to perform the sampling and analog-to-digital conversion via the plurality of sub-carrier processing modules $320_1$-$320_N$ (e.g., in time-interleaved manner).

The pre-processing block 310 may comprise suitable circuitry for handling reception of analog (RF) input signals, which may be the carrier analog signals of particular digital content, and for performing various initial processing of the received input signals, such as to enable subsequent extraction of data (e.g., content) carried thereby. In particular, when handling of signals comprising a plurality of sub-carriers, the pre-processing block 310 may be operable to identify and/or extract sub-carriers in particular inputs, to enable dedicated processing of each of the sub-carriers—e.g., via the sub-carrier processing modules $320_1$-$320_N$. For example, the pre-processing block 310 may be configured to amplify the received analog input, then quadrature-mix down the amplified outcome to baseband (e.g., using cosine and sine local signals) at the carrier frequency, apply low-pass filtering (e.g., to reject harmonics resulting from the quadrature-mixing), sample the baseband signals (e.g., using analog-to-digital converters), and apply a forward fast Fourier transform (FFT), to convert back to the frequency domain, resulting in parallel streams (e.g., N), corresponding to the sub-carriers, which may be fed into the sub-carrier processing modules $320_1$-$320_N$.

Each of the sub-carrier processing modules $320_1$-$320_N$ may comprise suitable circuitry for processing a particular input (e.g., one of an extracted plurality of sub-carriers). For example, each of the sub-carrier processing modules $320_1$-$320_N$ may comprise a corresponding signal processing block $322_i$ and a corresponding decoder $324_i$. In this regard, each of the signal processing blocks $322_1$-$322_N$ may comprise suitable circuitry for processing of a corresponding one of the N streams (corresponding to one of the N sub-carriers) obtained via the pre-processing block 310, to extract embedded data in that particular stream. Each of the decoders $324_1$-$324_N$ may comprise suitable circuitry for decoding the extracted data for each corresponding one of the N sub-carriers. In this regard, various encoding schemes or protocols may be utilized in encoding the channels carried via the sub-carriers.

The post-processing block 330 may comprise suitable circuitry for generating the output corresponding to an input of the receiver system 300 (e.g., received analog input signal). In this regard, the generated output may comprise, for example, content carried by the input, and/or may be configured based on various criteria (e.g., type of connection used to send the output to other systems/components, selection of desired content, format, etc.). For example, the post-processing block 330 may be configured to provide digital signal processing operations and/or functions. The post-processing block 330 may be operable to, for example, encode, decode, modulate, demodulate, encrypt, decrypt, scramble, descramble, and/or otherwise process data that may be carried in transmitted or received signals. In some instances, the post-processing block 330 may also be configured to select, apply, and/or adjust a modulation scheme, error coding scheme, and/or data rates based on type and/or characteristics of interface being used in communicating the signals (carrying the data).

In an example implementation, the receiver system 300 may be configured to perform phase error detection and correction on a per sub-carrier basis. For example, each of the sub-carrier processing modules $320_1$-$320_N$ may be configured to perform phase error detection and correction on the sub-carrier processed thereby. In this regard, each of the sub-carrier processing modules $320_1$-$320_N$ may comprise a corresponding phase error detection block $326_i$. Each of the phase error detection blocks $326_1$-$326_N$ may comprise suitable circuitry for detecting the phase error (e.g., noise) that is particular to a corresponding one of the N sub-carriers. In this regard, the phase error detection may be done based on the decoded channel data. In other words, rather than utilizing dedicated pilots for phase detection/correction, the actual data carried by each of the sub-carriers may be utilized in enabling the phase error estimation. The estimated phase errors (or information relating thereto) may be provided as feedback, in close-loop manner, to processing blocks in each of the sub-carrier processing modules $320_1$-$320_N$ to enhance and/or adjust processing of the sub-carriers. Thus, the more processing of each sub-carrier is done, the more refined that processing can be made, particularly with respect to phase error correction.

In operation, the receiver system 300 may be utilized in performing signal reception and in providing, among other things, phase detection and correction on per sub-carrier basis. In this regard, in some instances a single (RF) signal may be utilized to carry multiple streams (e.g., corresponding to multiple channels). In conventional multiple channel broadband systems, the multiple streams (channels) would come off a single closed spectrum capture converter, and thus they would all share the same phase noise (estimation) even though the phase errors may actually differ. Instead, the receiver system 300 may be operable to generate multiple phase error estimations. These estimations may then be adaptively applied to each channel (and, in some instances, may be shared across other channels). Such a multiple phase estimation based approach may be fundamentally different from common phase error, as used in legacy systems. In this regard, common phase error based implementations may use pilots (or may just use the output of the OFDM processing) to estimate what the phase error may be. For example, with conventional implementations, pilots tones (obtained from the FFT output) are used as phase estimates. Use of pilot tones as phase estimates, however, may not be reliable because the pilot tones themselves may be corrupted by noise. In other words, noise may degrade the system's ability to estimate phase noise.

Instead, per-channel based processing/estimation systems, such as the receiver system 300, are implemented as closed loop systems allowing for estimating the phase error for each one of the multiple sub-carriers, and/or may allow for use of data of each of the channels, rather than simply performing common phase error estimation based on pilot tones (and doing so commonly on all channels). Furthermore, these systems may allow for decision feedback (based on the per-channel estimation), to suppress phase noise as well (on a per-channel basis). In the example implementation shown in FIG. 3A, the phase error estimation may benefit from the channels coding in the processing path—e.g., to tell what the actual bit value the actual modulation map uses. For example, when the channel decoding is done, analysis of the actual bit values vs. what the values should be (e.g., as determined based on the actual constellation, which is known) may enable determining or estimating the phase noise and other type(s) of noise (e.g., white noise) that may be have corrupted the bits. Accordingly, the channel decoding (e.g., using the pre-determined constellation) may allow comparing the obtained bit values with what is expected to estimate the errors, and applying bit error correction to correct the bit values. In this regard, estimating phase errors based on channel coding (rather than pilot tones) may be desirable because it may be more accurate (for each sub-carrier, as it is based on the data embedded therein) and/or because it may allow for elimination of other noise (e.g., non-phase noise). In this regard, channel coding may allow determining what the data should have been, thus allowing determining (e.g., precisely) what the actual total errors may be (and averaging may be applied, to remove white noise and to just obtain an estimate for the added phase noise, which may correspond to the fall out of the DC component of the phase error).

The error estimations obtained during processing of the sub-carriers may be tracked and/or collected (e.g., stored in memory, such as the memory 220), and when enough of those sub-carrier signals are processed, more accurate estimation of, e.g., phase errors may be made. In some instances, the error estimates may be combined and used across the multiple channels, to further enhance (in a feedback manner) the processing. The phase detection (and correction) may be configured in an iterative manner. For example, in a first pass round, phase error estimates may be obtained. The phase errors estimates (single phase error estimates) may then be incorporated, in a second pass around, back into the data and the data may be decoded again. This process may be repeated iteratively, resulting in further refining of the phase error estimation/correction with each iteration round.

Figure 3B:
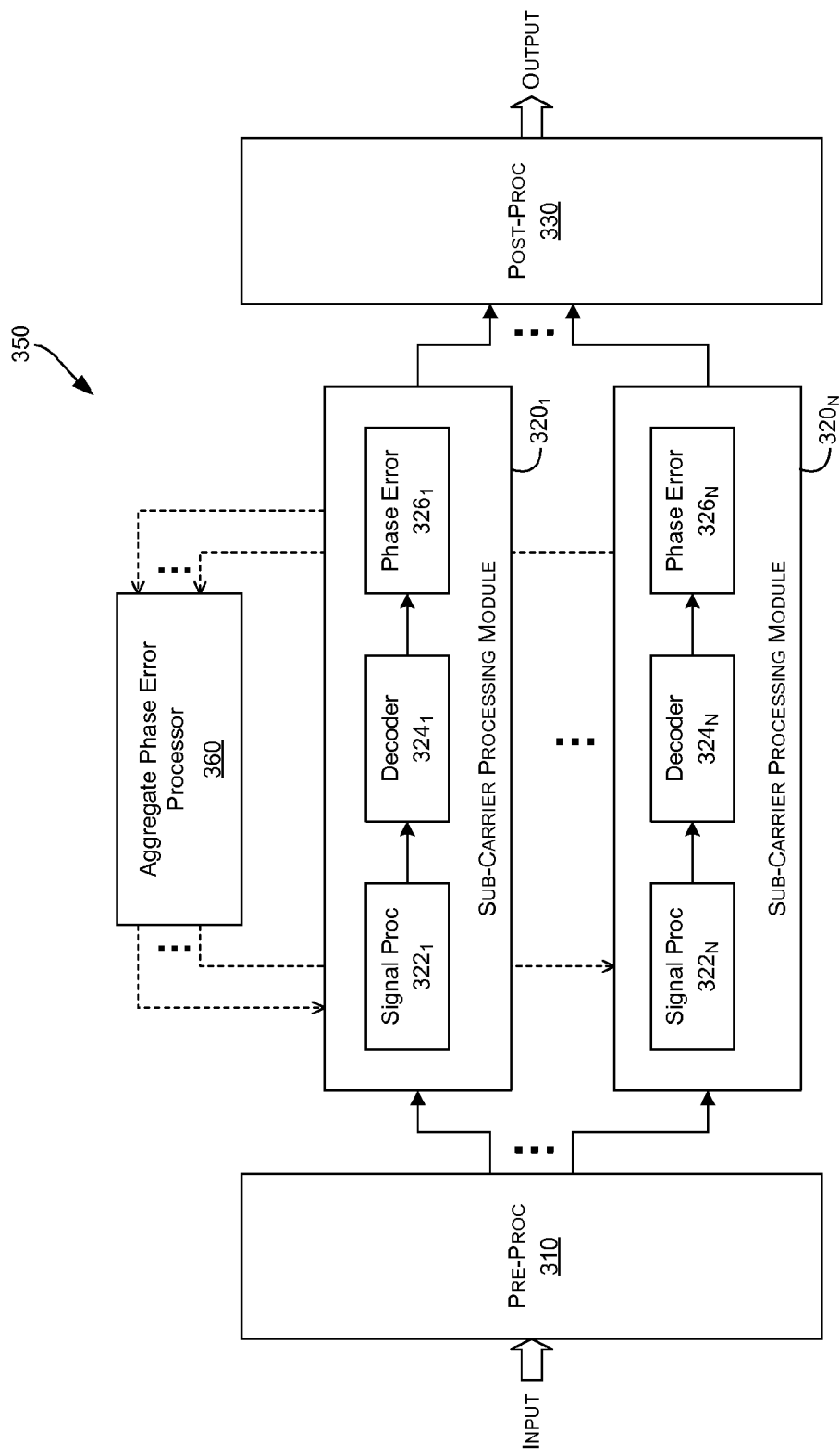
FIG. 3B illustrates an example receiver system, which may be configured to use decision feedback phase error correction based on aggregation of phase error information.

FIG. 3B illustrates an example receiver system, which may be configured to use decision feedback phase error correction based on aggregation of phase error information. Referring to FIG. 3B, there is shown a receiver system 350.

The receiver system 350 may be substantially similar to the receiver system 300, as described with respect to FIG. 3A. In this regard, the receiver system 350 may also comprise suitable circuitry for handling and/or performing signal reception (e.g., of radio frequency, or RF, signals) and/or processing operations related thereto. In this regard, the receiver system 300 may be configured to provide various reception and/or processing related operations and/or functions, comprising, e.g., receiving analog (RF) signals, such as via antennas (or other suitable means for wireless reception) or wired-based connectors, amplification, sampling and analog-to-digital conversions (if needed), and at least some signal processing (e.g., baseband/passband processing and/or digital signal processing). For example, as with the receiver system 300, the receiver system 350 may correspond to (at least a portion of) the signal processor 232 of the electronic device 200 in FIG. 2.

The receiver system 350 may be operable to receive and process an analog input, to generate an output (e.g., digital content) corresponding to information carried by (and extracted from) the received input. In this regard, the receiver system 350 may be configured to support handling of signals comprising one or more sub-carriers. Further, as with the as with the receiver system 300, the receiver system 350 may support use of decision feedback phase error detection and correction. The receiver system 350 may be configured, however, to support use decision feedback phase error correction based on aggregation of phase error information. For example, the receiver system 350 may comprise the pre-processing block 310, the plurality of sub-carrier processing modules $320_1$-$320_N$, the post-processing block 330, and an aggregate phase error processing block 360.

In operation, as with the receiver system 300, the receiver system 350 may be utilized in performing signal reception and in providing, among other things, phase detection and correction on per sub-carrier basis. For example, the receiver system 350 may be configured to perform the sampling and analog-to-digital conversion via the plurality of sub-carrier processing modules $320_1$-$320_N$ (e.g., in time-interleaved manner). Further, the receiver system 350 may be configured to perform phase error detection and correction, and to particularly do so on per sub-carrier basis, with aggregation of phase error related data, and/or to operate in iterative manner. As with the receiver system 300, the receiver system 350 may also be operable to handle phase error in a different way than that in legacy systems, which are typically implemented based on common phase error designs. In this regard, the receiver system 350 may also be configured to determine and/or generate phase error estimates (and/or other information) corresponding to each of the sub-carriers, with these phase error estimates (and/or other information) being adaptively applied to each channel (and, in some instances, may be shared across other channels). The receiver system 350 may be configured as closed loop, per-channel based processing/estimation system, thus allowing for estimating the phase error for each one of the multiple sub-carriers, and/or may allow for use of data of each of the channels, rather than simply performing common phase error estimation based on pilot tones (and doing so commonly on all channels). Thus, as with the receiver system 300, the phase error estimation in the receiver system 350 may also benefit from the channels coding in the processing path—e.g., to tell what the actual bit value the actual modulation map uses. In this regard, once channel decoding is done, analysis of the actual bit values vs. what the values should be (e.g., as determined based on the actual constellation, which is known) may enable determining or estimating the phase noise and other type(s) of noise (e.g., white noise) that may be have corrupted the bits.

For example, estimates of phase errors (or information relating thereto) may be obtained for each of the sub-carriers, and these estimated may be used as control feedback, in close-loop manner, to enable enhance and/or adjust processing of each sub-carriers (e.g., via each of the sub-carrier processing modules $320_1$-$320_N$). The aggregate phase error processing block 360 may be used, for example, to provide aggregate phase errors processing. In this regard, the aggregate phase error processing block 360 may comprise suitable circuitry for processing estimated phase errors from all of the signal paths—that is, all of the sub-carrier processing modules $320_1$-$320_N$. The estimated phase errors of all of the signal paths may be processed together, to produce a more accurate phase related feedback data (e.g., estimates of the phase noise), which may then be used to correct phase errors in loop-back manner (e.g., in suppressing the phase noise) in each of the signal paths.

The phase errors estimates may be used in the receiver system 350 in loop-back and iterative manner—that is, the phase errors estimates (or information related thereto) may not only be used to improved subsequent phase error related handling in the signal paths, but to also improve processing of the very input (e.g., decoding the very data) that was used in obtaining the phase error estimated. In other words, the processing done each of the signal paths (e.g., via each of the sub-carrier processing modules $320_1$-$320_N$) may be performed iteratively with the phase error estimates (or information related thereto) being used to re-perform the same processing on the same input while continuing to enhance and improve the processing of that input. For example, phase noise estimates may be used to iteratively improve decoding of the same symbol(s) used to estimating the phase noise. Use of multiple phase noise estimates in this manner may be desirable because each phase noise estimate may be corrupted by additive noise from the signal path.

The aggregate phase error processing block 360 may receive as input data obtained from each of the signal paths (e.g., each of the sub-carrier processing modules $320_1$-$320_N$). Further the data may correspond to different stages of the processing done in the signal paths. For example, aggregate phase error processing block 360 may receive inputs (from each of the signal paths) corresponding to hard or soft decisions, or error-corrected decisions, on each symbol being processed, thus allowing for estimating the actual phase error and to iteratively remove phase error introduced into the same symbol.

As with the receiver system 300, the receiver system 350 may be configured to perform phase error detection on a per sub-carrier basis. The receiver system 350, however, may be configured to aggregate phase error estimates and/or other related information from all signal paths, when determining corresponding phase error handling decisions (e.g., when determining corresponding corrections). In some instances, each of the sub-carrier processing modules $320_1$-$320_N$ may be configured to perform phase error detection directly, via the corresponding phase error detection block $326_i$ therein, substantially as described with respect to FIG. 3A, at least insofar as the detection part of the processing performed by each phase error detection block $326_i$. The estimated phase errors (or information relating thereto) may then be provided from the phase error detection blocks $326_1$-$326_N$ as inputs to the aggregate phase error processing block 360, which process all the phase error estimates (and/or related information) from all the signal paths. The aggregate phase error processing block 360 may then make decision on handling and/or correcting phase errors, and may do so separately for each of the sub-carrier processing modules $320_1$-$320_N$. These phase error correction information may then be provided from the aggregate phase error processing block 360 to the sub-carrier processing modules $320_1$-$320_N$, to enhance and/or adjust processing of the sub-carriers. In particular, the data provided by the aggregate phase error processing block 360 may be used to refine that processing performed in each of the sub-carrier processing modules $320_1$-$320_N$, particularly with respect to phase error correction. Further, the same data used in obtaining the phase error estimates may be iteratively reprocessed. The number of iterations that a particular input (e.g., symbol) is reprocessed in such loop-back manner may be determined, such as based on preconfigured setting and/or based on processing considerations (available time to re-process the same data). Once the loop-back/iterative processing is complete, the final output (the outcome of the last iteration) may be provided as output by each of the sub-carrier processing modules $320_1$-$320_N$.

Figure 4:
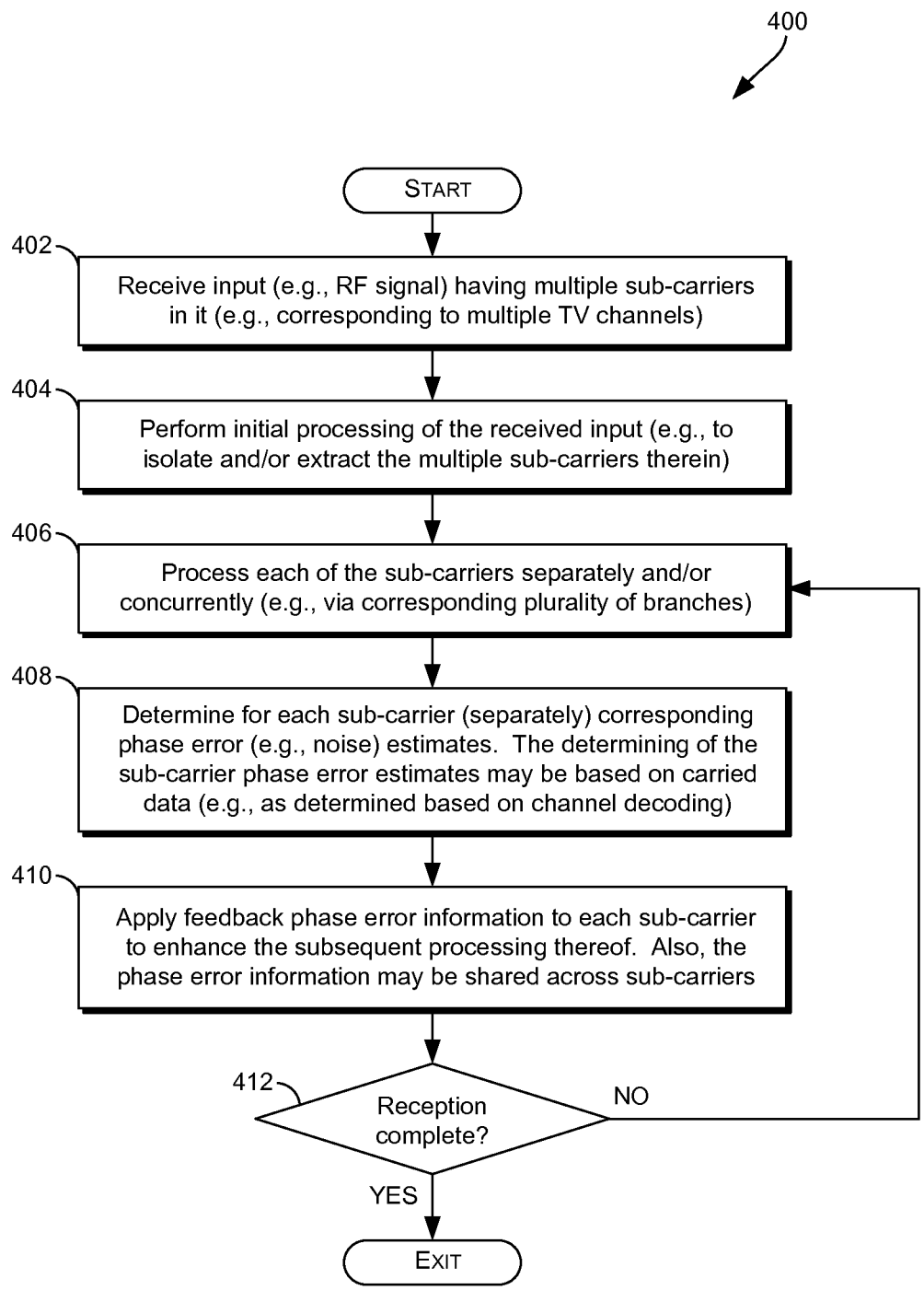
FIG. 4 is a flowchart illustrating an example process for using decision feedback phase error correction.

FIG. 4 is a flowchart illustrating an example process for using decision feedback phase error correction. Referring to FIG. 4, there is shown a flow chart 400, comprising a plurality of example steps, which may be performed (e.g., in a suitable system, such the receiver system 300 of FIG. 3A) to provide feedback phase error corrections.

In step 402, an input (e.g., RF signal) having multiple sub-carriers may be received. For example, the input may correspond to a cable television signal, with the multiple sub-carriers embedded therein corresponding to multiple channels.

In step 404, the received input may be processed. In this regard, the processing of the received input (e.g., via the pre-processing block 310 of the receiver 300) may comprise, inter alia, isolation and/or extraction of the multiple sub-carriers therein.

In step 406, the multiple sub-carriers may be processed separately and/or concurrently, such as via a corresponding plurality of sub-carrier processing branches, thus allowing for processing of each sub-carrier separately. In this regard, processing the multiple sub-carriers may result in extraction of data embedded therein. This extraction may entail performing, e.g., channel decoding.

In step 408, it may be determined, for each sub-carrier (separately), the corresponding phase error (e.g., noise). In this regard, the determining of the phase error for the sub-carrier may be based on carried data (e.g., as determined based on a channel) decoding.

In step 410, phase error information, for each sub-carrier, may be fed back, and may be utilized in enhancing the processing thereof. Further, in some instances, the phase error information may be shared across sub-carriers.

In step 412, it may be determined whether the reception of the input is complete. If the reception is complete, the process may terminate (with subsequent processing of the same sub-carriers that had been processed being, possibly, configured in accordance with the last feedback and/or shared information). If the reception is not complete, the process may loop back (e.g., to step 406) continue processing the sub-carriers. Thus, the processing of each of the sub-carriers may be continued by repeating steps 406-410. In other words, the processing of each sub-carrier and the generation of feedback information based thereon may be repeated iteratively to continue improving that processing. Accordingly, the determining of phase error may be used during processing of each sub-carrier in a closed-loop manner to enhance subsequent processing of the sub-carrier (including channel decoding).

Figure 5A:
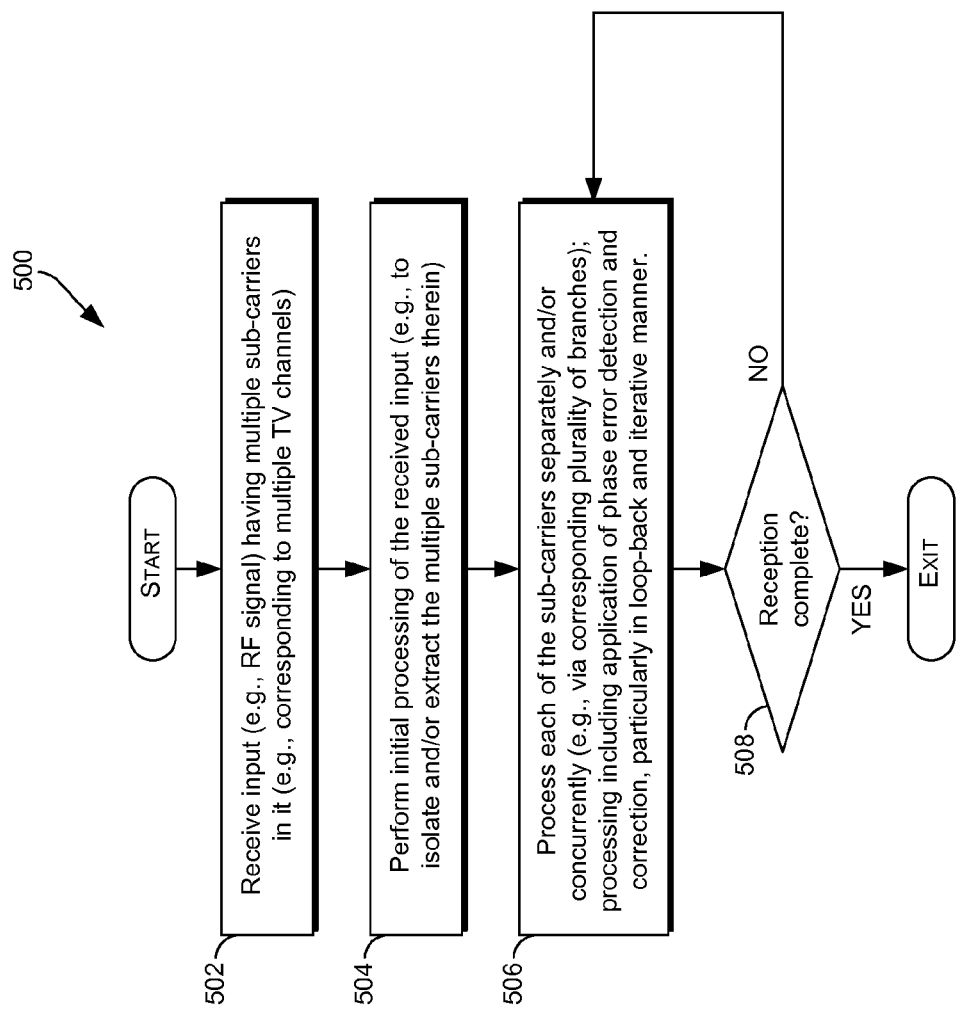
FIGS. 5A and 5B are flowcharts illustrating an example process for using decision feedback phase error correction based on aggregation of phase error information.
Figure 5B:
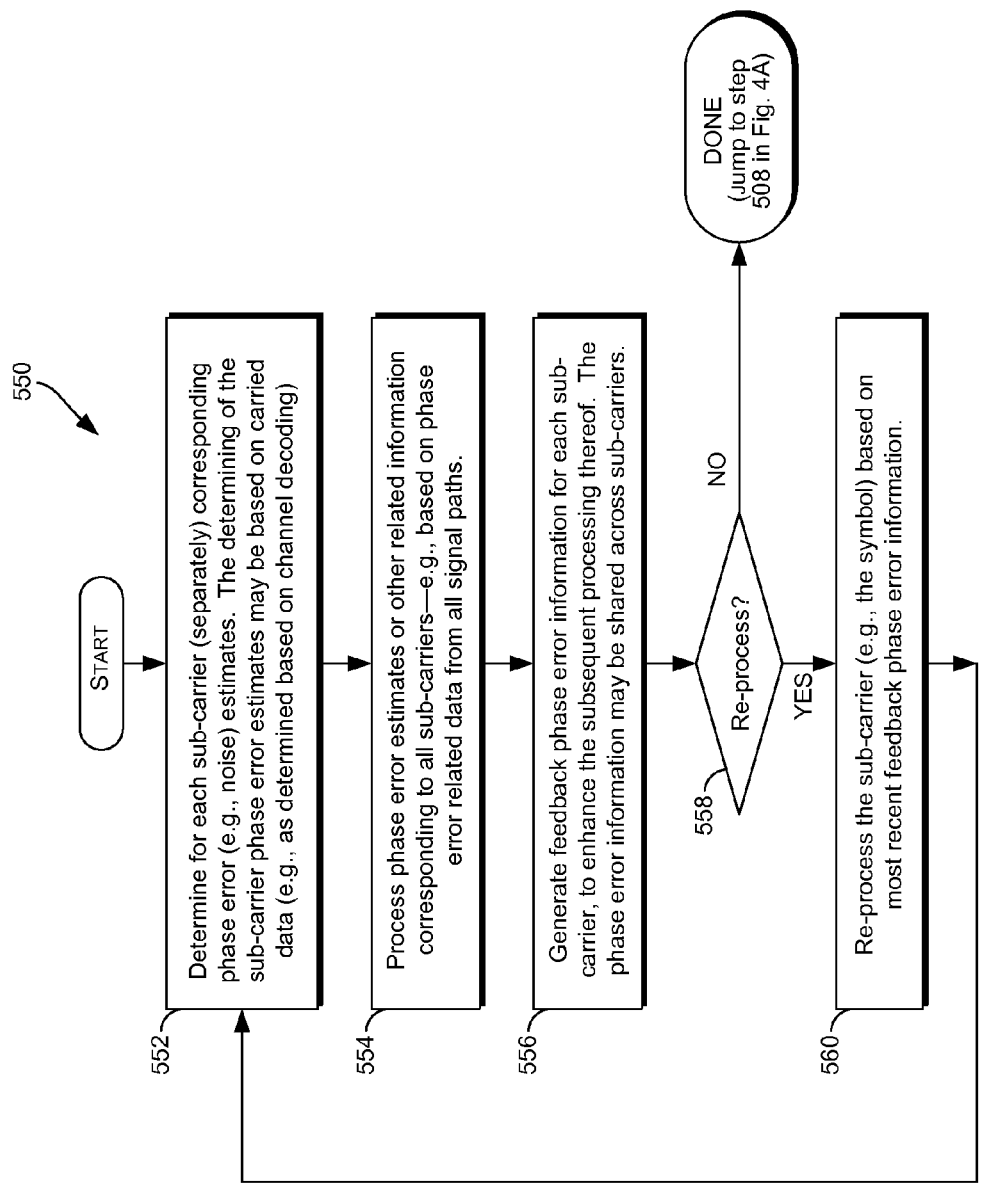

FIGS. 5A and 5B are flowcharts illustrating an example process for using decision feedback phase error correction based on aggregation of phase error information. Shown in FIGS. 5A and 5B are flow chart 500 and 550, each of which comprising a plurality of example steps, which may be performed (e.g., in a suitable system, such the receiver system 350 of FIG. 3B) to provide feedback phase error corrections, and to particularly do so in iterative manner and/or based on aggregation of phase error information.

In step 502, an input (e.g., RF signal) having multiple sub-carriers may be received. For example, the input may correspond to a cable television signal, with the multiple sub-carriers embedded therein corresponding to multiple channels.

In step 504, the received input may be processed. In this regard, the processing of the received input (e.g., via the pre-processing block 310 of the receiver 300) may comprise, inter alia, isolation and/or extraction of the multiple sub-carriers therein.

In step 506, each of the multiple sub-carriers may be processed separately and/or concurrently, such as via a corresponding plurality of sub-carrier processing branches, thus allowing for processing of each sub-carrier separately. In this regard, processing the multiple sub-carriers may result in extraction of data embedded therein. This extraction may entail performing, e.g., channel decoding. Further, processing of each of the sub-carriers may comprise application of phase error detection and correction. In particular, the processing of input may be performed based on loop-back and in iterative manner, as described in more detail below, with respect to the flow chart 550 shown in FIG. 5B.

In step 508, it may be determined whether the reception of the input is complete. If the reception is complete, the process may terminate (with subsequent processing of the same sub-carriers that had been processed being, possibly, configured in accordance with the most recent phase error related information fed back and/or shared. If the reception is not complete, however, the process may loop back (e.g., to step 506) continue processing the sub-carriers. Thus, the processing of each of the sub-carriers may be continued by repeating step 506. In other words, the processing of each sub-carrier and the generation of feedback information based thereon may be repeated, allowing for continued improving of that processing. Accordingly, the determining of phase error may be used during processing of each sub-carrier in a closed-loop manner to enhance subsequent processing of the sub-carrier (including channel decoding).

With reference to the flow chart 550 shown in FIG. 5B, in step 552, it may be determined, for each sub-carrier (separately), the corresponding estimates of phase error (e.g., noise) and/or information related thereto. In this regard, the determining of the phase error for the sub-carrier may be based on carried data (e.g., as determined based on a channel) decoding.

In step 554, phase errors corresponding to all of the sub-carriers—e.g., phase error related data from all signal paths—may be processed. For example, phase error and/or other related information from all of the sub-carrier processing slices may be fed into an aggregate processing component (e.g., the aggregate phase error processing block 360), which may then process that information.

In step 556, based on processing of phase error estimates from all sub-carriers, feedback phase error information may be generated (separately) for each sub-carrier, to enhance the subsequent processing thereof. Further, the phase error information may be shared across sub-carriers.

In step 558, it may be determined whether to re-process the particular sub-carrier input (data) currently being handled (to ensure iterative refinement of phase error correction). For example, the system may be configured, dynamically (e.g., based on time or performance thresholds) or pre-determinatively, to perform a certain number of iterative re-processing rounds. In instances where it is determined that no further re-processing is required for the particular sub-carrier, the process may terminate, thus allowing for handling the subsequent input of the sub-carrier. Further, subsequent processing of the same sub-carrier may be configured in accordance with the most recent phase error related information fed back and/or shared. In instances where it is determined no further re-processing of the current input of the particular sub-carrier is required, the process may proceed to step 560.

In step 560, if necessary the current input/data (e.g., the symbol) corresponding to the particular sub-carrier may be re-processed based on most recent feedback phase error information. The process may then jump back to step 552, to perform another iterative error detection and/or correction round to the same input/data.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for non-intrusive noise cancellation.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Accordingly, some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed:

1. A system, comprising:
one or more circuits for use in an electronic device during reception of signals, the one or more circuits being operable to:
when an input signal comprises a plurality of sub-carriers, separately process each the plurality of sub-carriers, the processing comprising determining for each one of the plurality sub-carriers error related information;

apply the determined error related information as feedback, such as to separately adjust subsequent processing of the corresponding one of the plurality of sub-carriers; and share the error related information obtained from processing of at least some of the plurality of sub-carriers, to allow adjusting processing of at least one of the plurality of sub-carriers based on error related information corresponding to at least another one of the plurality of sub-carriers.

2. The system of claim 1, wherein the error related information comprises phase error related information.

3. The system of claim 1, wherein the one or more circuits are operable to determine at least part of the error related information based on data carried by the corresponding one of the plurality of sub-carriers.

4. The system of claim 1, wherein the plurality of sub-carriers comprises orthogonal frequency-division multiplexing (OFDM) based sub-carriers.

5. The system of claim 1, wherein the one or more circuits are operable to apply initial processing of the input signal, the initial processing comprising extracting the plurality of sub-carriers.

6. The system of claim 1, wherein the one or more circuits are operable to apply post-processing, after processing of the plurality of sub-carriers, to generate an output combining data carried by at least some of the plurality of sub-carriers.

7. The system of claim 1, wherein the one or more circuits are operable to determine adjustment to subsequent processing of each one of the plurality of sub-carriers based on error related information corresponding to all of the plurality of sub-carriers.

8. The system of claim 1, wherein the one or more circuits are operable to:

iteratively re-determine error related information for at least one of the plurality of sub-carriers;

iteratively apply the re-determined error related information to re-process the at least one of the plurality of sub-carriers.

9. A method, comprising:

in an electronic device:

when an input signal comprises a plurality of sub-carriers, separately processing each the plurality of sub-carriers, the processing comprising determining for each one of the plurality sub-carriers error related information;

applying the determined error related information as feedback, such as to separately adjust subsequent processing of the corresponding one of the plurality of sub-carriers; and sharing the error related information obtained from processing of at least some of the plurality of sub-carriers, to allow adjusting processing of at least one of the plurality of sub-carriers based on error related information corresponding to at least another one of the plurality of sub-carriers.

10. The method of claim 9, wherein the error related information comprises phase error related information.

11. The method of claim 9, comprising determining at least part of the error related information based on data carried by the corresponding one of the plurality of sub-carriers.

12. The method of claim 9, wherein the plurality of sub-carriers comprises orthogonal frequency-division multiplexing (OFDM) based sub-carriers.

13. The method of claim 9, comprising applying initial processing of the input signal, the initial processing comprising extracting the plurality of sub-carriers.

14. The method of claim 9, comprising applying post-processing, after processing of the plurality of sub-carriers, to generate an output combining data carried by at least some of the plurality of sub-carriers.

15. The method of claim 9, comprising determining adjustment to subsequent processing of each one of the plurality of sub-carriers based on error related information corresponding to all of the plurality of sub-carriers.

16. The method of claim 9, comprising:

iteratively re-determining error related information for at least one of the plurality of sub-carriers;

iteratively applying the re-determined error related information to re-process the at least one of the plurality of sub-carriers.

17. A system, comprising:

a plurality of processing branches, wherein each of the plurality of processing branches comprises:

a signal processing circuit that is operable to process a corresponding one of a plurality of sub-carriers in an input signal;

an error detection circuit that is operable:

determine for the corresponding one of the plurality sub-carriers, error related information; and apply the determined error related information as feedback to the signal processing circuit, such as to separately adjust subsequent processing of the corresponding one of the plurality of sub-carriers; and one or more circuits that are operable to share the error related information obtained from processing of at least some of the plurality of sub-carriers, to allow adjusting processing of at least one of the plurality of sub-carriers based on error related information corresponding to at least another one of the plurality of sub-carriers.

18. The system of claim 17, wherein the error related information comprises phase error related information.

19. The system of claim 17, wherein error detection circuit that is operable to determine at least part of the error related information based on data carried by the plurality of sub-carriers.

20. The system of claim 19, wherein each of the plurality of processing branches comprises a decoder circuit that is operable to obtain data carried by the corresponding one of the plurality sub-carriers.

21. The system of claim 17, wherein the plurality of sub-carriers comprises orthogonal frequency-division multiplexing (OFDM) based sub-carriers.

22. The system of claim 17, comprising one or more pre-processing circuits that are operable to apply initial processing of the input signal, before processing via the plurality of processing branches, the initial processing comprising extracting the plurality of sub-carriers.

23. The system of claim 17, comprising one or more post-processing circuits that are operable to apply post-processing after processing via the plurality of processing branches, to generate an output combining data carried by at least some of the plurality of sub-carriers.

24. The system of claim 17, comprising an aggregate error processing circuit that is operable to determine adjustments to each of the plurality of processing branches, with respect to subsequent processing of each one of the plurality of sub-carriers, based on error related information corresponding to all of the plurality of sub-carriers.

25. The system of claim 17, wherein each of the plurality of processing branches is operable to iteratively re-process at least one of the plurality of sub-carriers based on re-determine error related information.

* * * * *